United States Patent
Oprea et al.

(10) Patent No.: US 7,681,193 B2
(45) Date of Patent: Mar. 16, 2010

(54) METHOD AND APPARATUS FOR PROVIDING ALTERNATIVE INSTALLATION STRUCTURES FOR DEPLOYMENT OF SOFTWARE APPLICATIONS

(75) Inventors: Andrei Oprea, Toronto (CA); C. Razvan Peteanu, North York (CA)

(73) Assignee: International Business Machines Corporation, Armonk, NY (US)

( * ) Notice: Subject to any disclaimer, the term of this patent is extended or adjusted under 35 U.S.C. 154(b) by 1414 days.

(21) Appl. No.: 11/070,592

(22) Filed: Mar. 2, 2005

(65) Prior Publication Data

US 2006/0200818 A1   Sep. 7, 2006

(51) Int. Cl.
G06F 9/44 (2006.01)
G06F 9/445 (2006.01)

(52) U.S. Cl. .................. 717/174; 717/177; 717/168; 717/172

(58) Field of Classification Search .................. None
See application file for complete search history.

(56) References Cited

U.S. PATENT DOCUMENTS

| | | | |
|---|---|---|---|
| 5,715,463 A | 2/1998 | Merkin | 395/712 |
| 6,477,572 B1 | 11/2002 | Elderton et al. | 709/224 |
| 2002/0141378 A1 | 10/2002 | Bays et al. | 370/351 |
| 2003/0018699 A1* | 1/2003 | Matthews et al. | 709/201 |
| 2003/0163807 A1* | 8/2003 | Drake et al. | 717/174 |
| 2004/0221267 A1* | 11/2004 | Chase et al. | 717/121 |

\* cited by examiner

*Primary Examiner*—Lewis A Bullock, Jr.
*Assistant Examiner*—Mark A Gooray
(74) *Attorney, Agent, or Firm*—Yee & Associates, P.C.; Jeffrey S. LaBaw

(57) ABSTRACT

A method, an apparatus, and computer instructions are provided for providing alternative installation structures for deployment of software applications. A set of requirements for software modules to be deployed are detected. Based on the hosting requirement, the present invention determines a set of candidate software modules by comparing the hosting requirements to capabilities of software modules in a software registry. Non-hosting requirements are cascaded for validation at a corresponding level. The present invention exposes software modules based on their supported requirement types and filters candidate hosting software modules based on options defined in the non-hosting requirements. Finally, a list of options with a list of candidate software modules is presented for user selection.

17 Claims, 4 Drawing Sheets

```
<requirements>
     <requirement hosting="true" type="SERVLET_ENGINE" name="servlet.version" value="2.3"/>
     <requirement hosting="false" type="OS" name="os.version">
       <value_option>Win2k</value_option>
       <value_option>XP</value_option>
     </requirement>
</requirements>
```

FIG. 5

- Tomcat
  - JDK 1.3
    - Linux
    - Win2K SP3
    - Solaris
  - JDK 1.4
    - Linux
  - WAS
    - Win2K SP3
    - XP
    - Linux

FIG. 6

- Tomcat
  - JDK 1.3
    - Win2K SP3
  - WAS
    - Win2K SP3
    - XP

FIG. 7

METHOD AND APPARATUS FOR PROVIDING ALTERNATIVE INSTALLATION STRUCTURES FOR DEPLOYMENT OF SOFTWARE APPLICATIONS

BACKGROUND OF THE INVENTION

1. Technical Field

The present invention relates to an improved data center. In particular, the present invention relates to deploying software applications in a data center. Still more particularly, the present invention relates to providing alternative installation structures for deployment of software applications in a data center.

2. Description of Related Art

In a data center, deployment of software applications typically requires complex setups that have common elements specific to the applications being deployed to the environment, and to the data center policies. For example, a Java software application may require a Java runtime environment (JRE) or Java development kit (JDK) to be installed before it can be deployed. Java runtime environment and Java development kit are products available from Sun Microsystems, Inc.

Currently, these complex setups are manually performed by administrators who manage the data center. Administrators have to run a requisite check on each software application to be deployed to determine a number of modules or packages that are required by the software application. The setup process not only requires human expertise, but is also error prone and time consuming. For example, since JDK includes a vast number of versions and subversions, an administration has to manually ensure that each of the required version or subversion is configured to be deployed.

In addition, a software application may be deployed in several ways by using a variety of underlying infrastructure topologies. Some existing deployment mechanisms recognize the requirements for each composing module of the software application to be deployed as well as dependencies between the composing modules. Other deployment mechanisms prevent an incomplete deployment by checking the prerequisites of a software installation on running user machines. However, none of these existing deployment mechanisms provide alternative installation structures of software modules that enable a complete installation or that may be configured before a user machine is powered up.

Therefore, it would be advantageous to have an improved method, apparatus, and computer instructions for providing alternative installation structures for deployment of software applications, such that an installation failure may be avoided by actively searching valid paths that yield a complete installation.

SUMMARY OF THE INVENTION

The present invention provides a method, an apparatus, and computer instructions for providing alternative installation structures for deployment of software applications. The mechanism of the present invention detects a set of requirements defined by a user for a plurality of software modules to be deployed to a plurality of data processing systems, compares a set of hosting requirements in the set of requirements to capabilities of a plurality of software modules in a software registry, and determines a set of candidate hosting software modules based on the set of hosting requirements.

In addition, the mechanism of the present invention cascades a set of non-hosting requirements in the set of requirements for validation at a corresponding level, exposes the plurality of software modules in the software registry based on supported requirement types of the software modules, filters the set of candidate hosting software modules using the exposed software modules based on a set of options in the set of non-hosting requirements, and presents a list of filtered software modules to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram of an exemplary hosting requirement for a Web module in a deployment descriptor file, in accordance with a preferred embodiment of the present invention;

FIG. 6 is a diagram illustrating an exemplary list of options for the Web module defined in FIG. 5 prior to filtering of candidate software modules, in accordance with a preferred embodiment of the present invention;

FIG. 7 is a diagram illustrating an exemplary list of options for the Web module defined in FIG. 5 after filtering of candidate software modules is depicted in accordance with a preferred embodiment of the present invention and FIG. 8 is a flowchart of an exemplary process for providing alternative installation structure for deployment of software applications in accordance with a preferred embodiment of the present invention.

DETAILED DESCRIPTION OF THE PREFERRED EMBODIMENT

Figure 1:
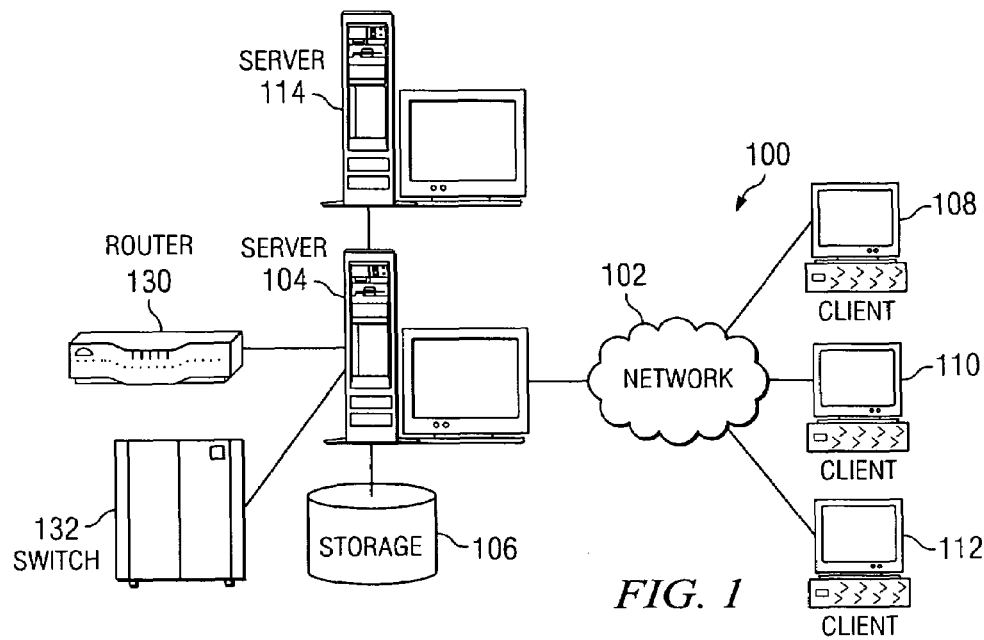
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

Furthermore, server 104 may be connected to other resources, such as router 130, server 114, switch 132 and storage 106. In the present invention, these resources in combination with network data processing system 100 make up a data center.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
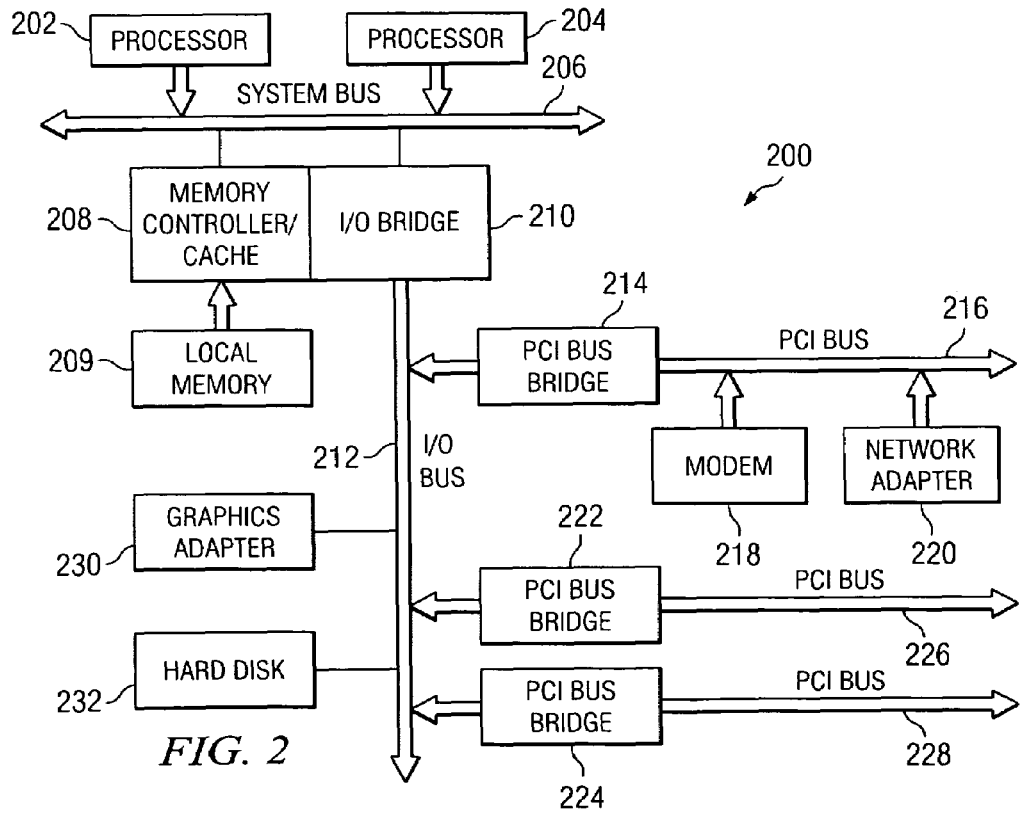
FIG. 2 is a block diagram of a data processing system that may be implemented as a server, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

Figure 3:
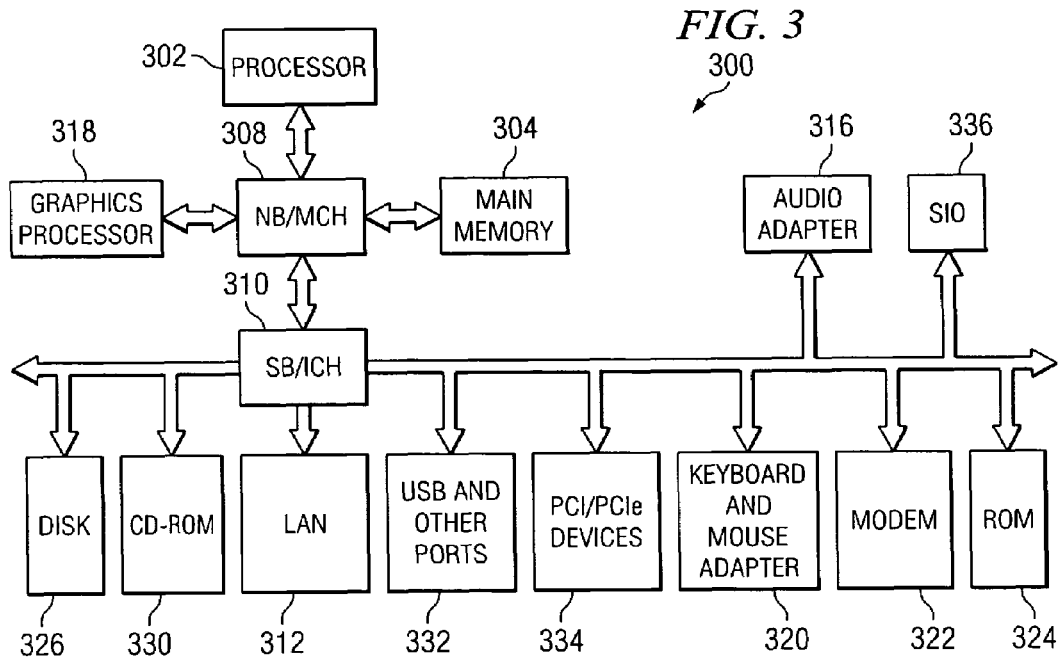
FIG. 3 is a block diagram of a data processing system in which a preferred embodiment of the present invention may be implemented.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™ operating system, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

The processes of the present invention are performed by processor 302 using computer implemented instructions, which may be located in a memory such as, for example, main memory 304, memory 324, or in one or more peripheral devices 326 and 330.

The present invention provides a method, apparatus, and computer instructions for providing alternative installation structures for deployment of software applications. In a preferred embodiment, the mechanism of the present invention determines a number of modules or packages necessary for deployment of software applications in a user machine of a data center.

Before the user machine is configured and powered up in the data center, the mechanism of the present invention detects a list of requirements defined for each composing module of the software application to be deployed. The list of requirements includes hosting requirements, such as, for example, run time environments, packages, libraries, fixes, and non-hosting requirements. In a preferred embodiment, a user may specify a list of hosting requirements for deploying a number of software modules in a deployment descriptor file. The deployment descriptor file may be an extensible markup language (XML) file.

Once the hosting requirements are detected, the mechanism of the present invention compares the hosting requirements to the capabilities of other software modules that are defined in a software registry. A software registry is a repository of software modules that are used to support an installation of a client software application.

Based on the hosting requirements, the mechanism of the present invention then searches for candidate hosting software modules. If more than one hosting requirement is specified for a software module, the candidate hosting software module has to meet all of the hosting requirements.

The mechanism of the present invention builds a list of candidate hosting software modules for each software module to be deployed by recursively searching for software modules that have hosting requirements matching the capabilities exposed by other software modules in the software registry. The recursive search is performed until the hosting modules are identified as operating system modules, hosted by individual machines.

In addition to hosting requirements, non-hosting requirements of each software module to be deployed are cascaded down as the hosting list is being built, in order to validate non-hosting requirements at a corresponding level. The corresponding level is the level specified by the requirement type. For example, software module type, run time environment type, and operating system type.

The software registry may contain a number of software modules that are currently running on other user machines in the data center and are reusable by other software modules. In the software registry, each defined software module includes a list of supported requirement types. When candidate hosting software modules are searched, the mechanism of the present invention identifies the supported requirement type for the software module in the registry. In this way, only correct requirement types are matched against the hosting requirements. For example, a Java development kit requirement, e.g., a run time environment requirement type, would not be matched against a "tomcat" module requirement, e.g., a software module type, since they belong to different requirement types.

Within the list of requirements defined in the deployment descriptor file, the user may specify a list of options for each requirement. For example, an operating system requirement may include options, such as Windows 2000, LINUX, and Solaris. Windows 2000 is a product available from Microsoft Corporation. Solaris is a product available from Sun Microsystems, Inc.

When searching for candidate hosting software modules, the mechanism of the present invention exposes each software module in the software registry based on the module's supported requirement types. For example, for a software module that has Windows 2000 as a hosting requirement, the mechanism of the present invention exposes the operating system as the module's supported requirement type.

In another example, for a software module that has Windows XP software and WebSphere Application Server software as hosting requirements, the mechanism of the present invention exposes the operating system, the runtime environment, the Enterprise JavaBeans™ container, and the servlet engine as the software module's supported requirement types. Windows XP software is a product available from Microsoft Corporation and Enterprise JavaBeans™ software is a specification available from Sun Microsystems, Inc.

By exposing each software module in the software registry based on its supported requirement type, each module may be used to host not only a software stack, which is a level of software support, but also a standalone software product that requires that same requirement type. For example, a user may desire to deploy a Web module that requires Java development Kit (JDK) version 1.4. Based on this hosting requirement, instead of exposing all the software modules in the registry, the mechanism of the present invention only exposes software modules that have the same runtime environment requirement, for example, the WebSphere Application Server software.

In this way, the mechanism of the present invention may query the software registry to determine which software module provides the access necessary to the required hosting requirement for the module to be deployed. This query is performed without the need of a running user machine. Thus, the mechanism of the present invention has an advantage over the prior art, in that a user may configure an empty user machine with necessary software modules by using a list of options generated by the present invention based on the supported requirement types of the software modules in the software registry.

In addition to exposing software modules based on the supported requirement types, at each level of software stack or requirement type, the mechanism of the present invention also minimizes the number of software modules exposed by filtering out the candidate hosting software modules based on the list of options specified by the user. For example, if the user specifies options for the operating system requirement type to be either Windows 2000 software or Windows XP software, the mechanism of the present invention filters out the software modules that do not have either Windows 2000 software or Windows XP software as the operating system. In this way, a list of options may be presented to the user, so that the user may select desired software modules to be deployed having the necessary hosting requirements without having to power up the user machines.

Figure 4:
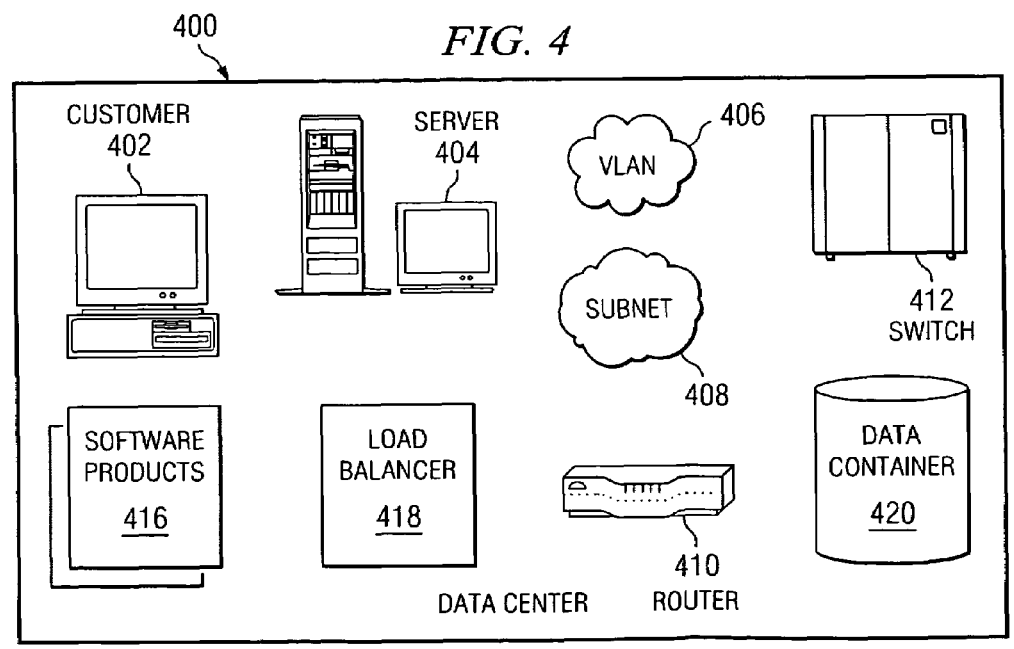
FIG. 4 is a diagram illustrating an exemplary data center, in accordance with a preferred embodiment of the present invention.

Turning now to FIG. 4, a diagram illustrating an exemplary data center is depicted, in accordance with a preferred embodiment of the present invention. As shown in FIG. 4, in this illustrative example, data center 400 includes resources, such as, customer 402, server 404, Virtual Local Area Network (VLAN) 406, subnet 408, router 410, switch 412, software products 416, load balancer 418, and data container 420.

Customer 402 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services, or other types of servers. Router 410 and switch 412 facilitate communications between different devices. VLAN 406 is a network of computers that behave as if they are connected to the same wire even though they may actually be physically located on different segments of a local area network. Subnet 408 is a portion of a network, which may be a physically independent network segment and shares a network address with other portions of the network.

Software products 416 are applications that may be deployed to a client or a server. Load balancer 418 spreads traffic among multiple systems such that no single system is overwhelmed. The mechanism of the present invention deploys software products 416 as specified by a user, such as customer 402, to a user machine, such as data processing system 300 in FIG. 3, or a server, such as data processing system 200 in FIG. 2.

Load balancer 418 is normally implemented as software running on a data processing system. Data container 420 may be a database, such as DB2 Universal Database, a product available from International Business Machines Corporation.

Data center 400, as depicted in FIG. 4, is presented for purposes of illustrating the present invention. Other resources, such as, for example, cluster of servers and switch port, also may be included in data center 400.

Turning now to FIG. 5, a diagram of an exemplary hosting requirement for a Web module in a deployment descriptor file is depicted, in accordance with a preferred embodiment of the present invention. As depicted in FIG. 5, deployment descriptor file 500 is implemented as a markup language file, such as an XML file.

Deployment descriptor file 500 for the Web module to be deployed includes two requirements, requirements 502 and 504. Requirement 502 specifies hosting requirement type SERVLET_ENGINE 506 with a name of "servlet.version" 508 and a value of "2.3" 510.

Requirement 502 dictates the next module in the software stack and requirement 504 is cascaded down and checked at its corresponding level. Requirement 502 defines a non-hosting requirement, "OS" 512, which stands for operating system, with a name of "os.version" 514. Within OS requirement 502, there are two options: Win2K 516, which stands for Windows 2000 software, and XP 518, which stands for Windows XP software.

Turning now to FIG. 6, a diagram illustrating an exemplary list of options for the Web module defined in FIG. 5 prior to filtering of candidate software modules, is depicted in accordance with a preferred embodiment of the present invention. As depicted in FIG. 6, the mechanism of the present invention exposes each software module in the software registry based on its hosting requirement.

In this example, the mechanism of the present invention exposes software module "tomcat" 600, which is a type of servlet container available from The Apache Software Foundation. "Tomcat" 600 may be executed under runtime environment "JDK 1.3" 602, "JDK 1.4" 604, and "WAS" 606, which stands for WebSphere Application Server software. "JDK 1.3" 602 may be executed on Linux 608 software, Win2K SP3 610, which stands for Windows 2000 service pack 3 software, and Solaris 612 software. "JDK 1.4" 604 may be executed on Linux 614 and "WAS" 606 may be executed on W2K SP3 616, XP 618, which stands for Windows XP software, and Linux 620 software.

In a preferred embodiment, the mechanism of the present invention matches requirements 502 and 504 in FIG. 5 for the Web module to be deployed against a list of options in FIG. 6 to determine candidate hosting software modules based on the hosting requirements.

As mentioned above, the mechanism of the present invention also filters out candidate hosting software module by the list of options for each non-hosting requirement. Turning now to FIG. 7, a diagram illustrating an exemplary list of options for the Web module defined in FIG. 5 after filtering of candidate software modules is depicted in accordance with a preferred embodiment of the present invention. As depicted in FIG. 7, requirement 504 in FIG. 5 is cascaded down to be checked at its corresponding level. Requirement 502 indicates two options for operating system, Win2K or XP.

In this example, based on requirement 502 for the Web module, software module "tomcat" 700 is filtered for runtime environment that may be executed on either Win2K or XP. Thus, the mechanism of the present invention filters out the LINUX and Solaris operating systems. As shown in FIG. 7, only two run time environment remains, "JDK 1.3" 702 and "WAS" 704, since "JDK 1.3" 702 may be executed on Win2K SP3 704 and "WAS" 705 may be executed either on Win2K SP3 706 or on XP 708.

Figure 8:
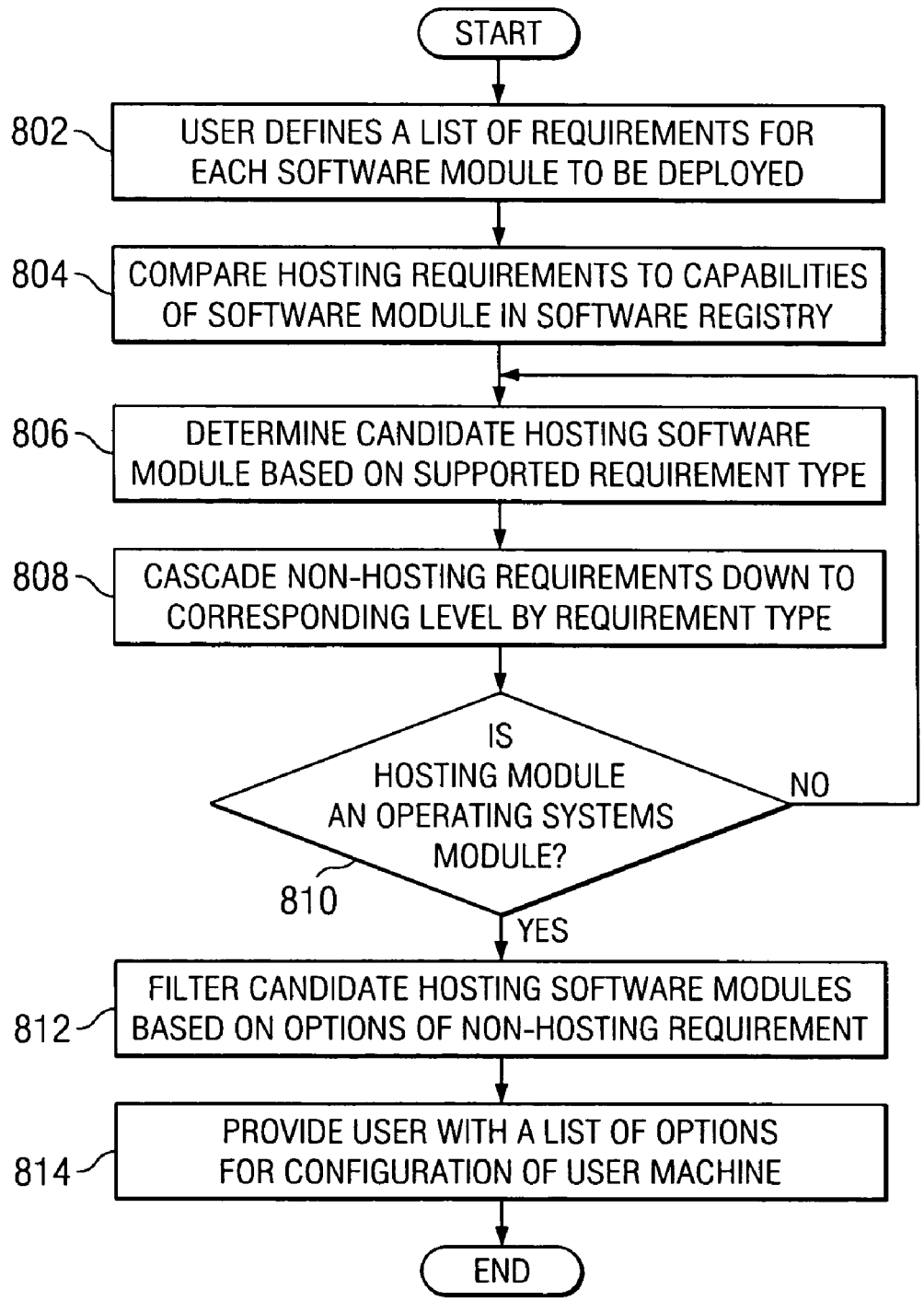

Turning now to FIG. 8, a flowchart of an exemplary process for providing alternative installation structure for deployment of software applications is depicted in accordance with a preferred embodiment of the present invention. As shown in FIG. 8, the process begins when a user specifies a list of requirements for each software module to be deployed (step 802). The list of requirements may be defined in a deployment descriptor file associated with a software application. This file may be formatted using a markup language, such as extensible markup language (XML).

Next, the mechanism of the present invention compares the hosting requirement within the list of requirements from step 802 to capabilities of software modules defined in the software registry (step 804). The software registry may contain a number of software modules that are currently running on other user machines in the data center and are reusable by other software modules.

The mechanism of the present invention determines candidate hosting software modules by exposing software modules in the software registry based on their supported requirement types (step 806). At the same time, the mechanism of the present invention cascades the non-hosting requirements down to their corresponding level by the requirement type (step 808).

The mechanism of the present invention then determines whether the hosting software module being examined is an operating system module (step 810). The operating system module is a module hosted by the physical machine. If the module being examined is not an operating system module, the process returns to step 806 to continue determining candidate hosting software modules.

Otherwise, the mechanism of the present invention filters the searched candidate hosting software modules based on options that are defined for each non-hosting requirement (step 812). In other words, only options that are defined in the non-hosting requirements are exposed to the user.

Once the candidates are filtered, the mechanism of the present invention provides a list of options or alternatives to the user for configuration of individual user machines (step 814). Thus, the process terminates thereafter. In this way, individual user machines may be configured based on available reusable software modules currently existing in the data center without requiring running user machines.

In summary, the present invention provides advantages over the prior art by providing alternative installation structure for deployment of software applications. Instead of requiring running systems to determine alternatives, the present invention allows users to configure offline user machines by providing a list of options for software modules to be deployed to those machines based on requirements specified by the user. The user may select from the list of options which software module to deploy.

The present invention may also be implemented to provide hardware alternatives by providing a list of options for hardware requirements of individual user machines. For example, if one gigabyte of RAM is required for a user machine to be configured, the mechanism of the present invention may provide a list of user machines in the data center that has at least one gigabyte of RAM for use. Other hardware requirements may be cascaded down to its corresponding level based on the hardware requirement type.

In this way, the present invention may be expanded for use in other situations, such as disaster recovery. Disaster recovery occurs when user machines in the data center encounter operation failures, whether software or hardware failures. Using the prior art mechanisms, running machines are required for determining alternatives of software modules to be deployed. However, with the present invention, alternatives for the failure are provided to the user, such that the user may select other software modules to be deployed to the offline machines.

For example, the servlet in the engine WebSphere Application Server may experience a failure in a particular user machine in a data center. Upon receiving the error, the mechanism of the present invention may adjust the user machine to a crisis mode by deploying a "tomcat" software module, such that basic operations of the user machine may continue.

Furthermore, with the ability to adjust to a crisis or disaster recovery situation, the present invention may adjust user machines from one set of configurations to another by providing a list of pre-selected options. In this way, the user may quickly identify an alternative set of software modules in case of clean install or new releases.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing alternative installation structures for deployment of software applications, the method comprising:

detecting a set of requirements for a plurality of software modules to be deployed to a plurality of data processing systems, wherein the set of requirements is defined in an extensible markup language file;

comparing a set of hosting requirements in the set of requirements to capabilities of the plurality of software modules in a software registry, wherein the software registry is a repository of software modules for supporting an installation of a client software application;

identifying a set of candidate hosting software modules based on the set of hosting requirements;

cascading a set of non-hosting requirements in the set of requirements for validation at a corresponding level, wherein the corresponding level is specified by a requirement type of the software modules;

exposing the plurality of software modules in the software registry based on supported requirement types of the software modules, wherein the supported requirement types include software module requirements, runtime environment requirements, and operating system requirements;

filtering the set of candidate hosting software modules using the exposed plurality of software modules based on a set of options in the set of non-hosting requirements, wherein the filtering comprises:

selecting an option from the set of options;

determining if each of the exposed plurality of software modules matches the selected option; and removing a respective exposed software module from the set of candidate software modules if the respective exposed software module does not match the option; and presenting a list of filtered software modules to a user.

2. A computer program product in a computer readable recordable-type medium, the medium comprising instructions for accomplishing the method of claim 1.

3. A data processing system for providing alternative installation structures for deployment of software applications, the data processing system comprising:

a processor comprising computer implemented instructions located in a memory, wherein the instructions are executed by the processor to detect a set of requirements for a plurality of software modules to be deployed to a plurality of data processing systems, wherein the set of requirements is defined in an extensible markup language file;

compare a set of hosting requirements in the set of requirements to capabilities of the plurality of software modules in a software registry, wherein the software registry is a repository of software modules for supporting an installation of a client software application;

identify a set of candidate hosting software modules based on the set of hosting requirements;

cascade a set of non-hosting requirements in the set of requirements for validation at a corresponding level, wherein the corresponding level is specified by a requirement type of the software modules;

expose the plurality of software modules in the software registry based on supported requirement types of the software modules, wherein the supported requirement types include software module requirements, runtime environment requirements, and operating system requirements;

filter the set of candidate hosting software modules using the exposed plurality of software modules based on a set of options in the set of non-hosting requirements, wherein filter the set of candidate hosting software modules comprises:

select an option from the set of options;

determine if each of the exposed plurality of software modules matches the selected option; and remove a respective exposed software module from the set of candidate software modules if the respective exposed software module does not match the option; and present a list of filtered software modules to a user.

4. A method in a data processing system for providing alternative installation structures for deployment of software applications, the method comprising:
- detecting a set of preexisting requirements for a plurality of software modules to be deployed to a plurality of data processing systems;
- comparing a set of hosting requirements in the set of preexisting requirements to capabilities of the plurality of software modules in a software registry, wherein the software registry is a repository of software modules for supporting an installation of a client software application;
- identifying a set of candidate hosting software modules based on the set of hosting requirements;
- cascading a set of non-hosting requirements in the set of preexisting requirements for validation at a corresponding level;
- exposing the plurality of software modules in the software registry based on supported requirement types of the software modules;
- filtering the set of candidate hosting software modules using the exposed software modules based on a set of options in the set of non-hosting requirements; and
- presenting a list of filtered software modules.

5. The method of claim 4, wherein the set of non-hosting requirements includes operating system requirements, and wherein the set of preexisting requirements is defined in an extensible markup language file.

6. The method of claim 4, wherein the supported requirement types include software module requirements, runtime environment requirements, and operating system requirements, and wherein the corresponding level is specified by a requirement type of the software modules.

7. The method of claim 4, wherein the identifying and cascading steps are performed until a candidate software module is identified as an operating system module.

8. The method of claim 4, wherein the filtering step comprises:
- selecting an option from the set of options;
- determining if each of the exposed software modules matches the selected option; and
- removing the exposed software module from the set of candidate software modules if the exposed software module does not match the option.

9. A computer program product comprising a computer-readable recordable-type data storage medium, the data storage medium comprising instructions for accomplishing the method of claim 8.

10. A computer program product comprising a computer-readable recordable-type data storage medium, the data storage medium comprising instructions for accomplishing the method of claim 4.

11. The computer program product of claim 10, wherein the supported requirement types include software module requirement, runtime environment requirement, and operating system requirement type, and wherein the corresponding level is specified by a requirement type of the software modules.

12. The computer program product of claim 10, wherein the instructions are executable by a data processor to identify and cascade until a candidate software module is identified as an operating system module.

13. A data processing system for providing alternative installation structures for deployment of software applications, the data processing system comprising:
- a processor comprising computer implemented instructions located in a memory, wherein the instructions are executed by the processor to detect a set of preexisting requirements for a plurality of software modules to be deployed to a plurality of data processing systems;
- compare a set of hosting requirements in the set of preexisting requirements to capabilities of the plurality of software modules in a software registry, wherein the software registry is a repository of software modules for supporting an installation of a client software application;
- identify a set of candidate hosting software modules based on the set of hosting requirements;
- cascade a set of non-hosting requirements in the set of preexisting requirements for validation at a corresponding level;
- expose the plurality of software modules in the software registry based on supported requirement types of the software modules;
- filter the set of candidate hosting software modules using the exposed software modules based on a set of options in the set of non-hosting requirements; and
- present a list of filtered software modules.

14. The data processing system of claim 13, wherein the set of non-hosting requirements includes operating system requirements, and wherein the set of preexisting requirements is defined in an extensible markup language file.

15. The data processing system of claim 13, wherein the supported requirement types include software module requirement, runtime environment requirement, and operating system requirement type, and wherein the corresponding level is specified by a requirement type of the software modules.

16. The data processing system of claim 13, wherein the instructions are executed by the processor to identify and cascade until a candidate software module is identified as an operating system module.

17. The data processing system of claim 13, wherein the instructions are executed by the processor to filter the set of candidate hosting software modules by selecting an option from the set of options, by determining if each of the exposed software modules matches the selected option; and by removing the exposed software module from the set of candidate software modules if the exposed software module does not match the option.

* * * * *